United States Patent [19]

Ruff

[11] Patent Number: 4,980,143
[45] Date of Patent: Dec. 25, 1990

[54] PROCESS FOR INCREASING THE PERCENTAGE OF SILICON TETRACHLORIDE

[75] Inventor: Klaus Ruff, Troisdorf, Fed. Rep. of Germany

[73] Assignee: Huels Aktiengesellschaft, Marl, Fed. Rep. of Germany

[21] Appl. No.: 364,246

[22] Filed: Jun. 9, 1989

[30] Foreign Application Priority Data

Aug. 20, 1988 [DE] Fed. Rep. of Germany ....... 3828344

[51] Int. Cl.$^5$ ............................................. C01B 33/08
[52] U.S. Cl. ..................................... 423/341; 423/342
[58] Field of Search .............................. 423/341, 342

[56] References Cited

U.S. PATENT DOCUMENTS

4,044,109 8/1977 Kotzsch et al. ...................... 423/341

FOREIGN PATENT DOCUMENTS

0156318 9/1982 Japan .................................. 423/341

OTHER PUBLICATIONS

Kojundo Silicon KK, JP-005691, 7/22/82 Abstract.

Primary Examiner—Gary P. Straub
Assistant Examiner—Lori F. Cuomo
Attorney, Agent, or Firm—Felfe & Lynch

[57] ABSTRACT

A process is described for increasing the percentage of silicon tetrachloride during the reaction of hydrogen chloride or a mixture of hydrogen chloride and chlorine with substances containing metallic silicon. In this process the chlorosilanes are exposed to a temperature ranging between 300° C. and 1400° C.

2 Claims, 1 Drawing Sheet

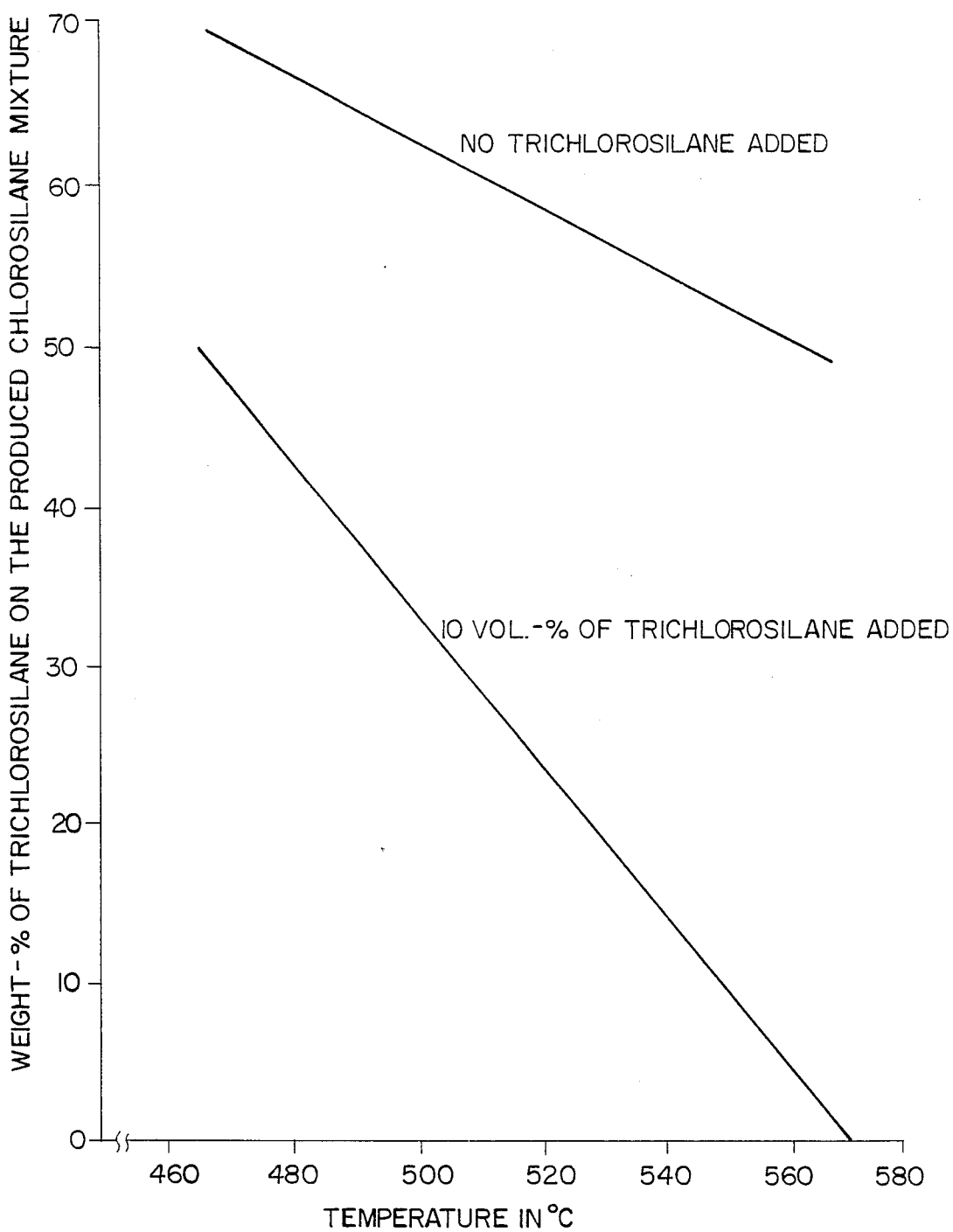

PROCESS FOR INCREASING THE PERCENTAGE OF SILICON TETRACHLORIDE

The invention relates to a process for increasing the percentage of silicon tetrachloride during the reaction of hydrogen chloride or a mixture of hydrogen chloride and chlorine with substances containing metallic silicon at a reaction temperature ranging between 300° C. and 1,400° C.

During the reaction of silicon with hydrogen chloride the reaction mixture contains silicon tetrachloride, trichlorosilane and, to a small extent, dichlorosilane. At low reaction temperatures the percentage of trichlorosilane predominates, at higher temperatures silicon tetrachloride is predominantly formed. According to the DE-OS 32 30 590 the percentage of trichlorosilane in the reaction mixture is at 260° C. appr. 95 weight-%, at 400° C. appr. 70 weight-%, at 600° C. appr. 40 weight-% and at 800° C. appr. 20 weight-% at reaction equilibrium. The percentage of dichlorosilane in the reaction mixture is small and amounts to 1 to 2 weight-%, at a maximum.

The ratio between trichlorosilane and silicon tetrachloride is determined by the reaction temperature--while all other reaction conditions are the same. When these two compounds are simultaneously produced in a plant a high economical significance falls to the adjustment to a changing demand for the components of this mixture.

Selecting various reaction temperatures in order to adjust to what is demanded is not possible since the installation of a reactor which includes the appertaining cooling system to remove the reaction heat and is to be operated in a larger temperature range involves a great expense and cost and is hence not economical.

The silicon tetrachloride percentage can be increased by converting the trichlorosilane resulting from the reaction into silicon tetrachloride by chlorination, e.g. photochlorination, during a subsequent operational step. This process, too, involves a great expense.

Hence, it was an object of the invention to provide an economical process for increasing the percentage of silicon tetrachloride during the reaction of hydrogen chloride or a metallic mixture of hydrogen chloride and chlorine with substances containing silicon.

Accomplishing this object a process was found to increase the percentage of silicon tetrachloride during the reaction of hydrogen chloride or a mixture of hydrogen chloride and chlorine with substances containing metallic silicon; the temperature selected ranged between 300° C. and 1400° C.; this process is characterized in that chlorosilane of the general formula

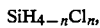

$SiH_{4-n}Cl_n$, wherein $n=1$ to 3, is additionally introduced into the reaction chamber. Depending on the reaction conditions the hydrogen chloride and silicon in the presence of the additionally introduced chlorosilanes form not only less trichlorosilane than without this addition but also the chlorosilanes used in the process are completely or partially converted into silicon tetrachloride.

This effect occurs independently from the reactor type; the yield of silicon tetrachloride can thus be increased in a fluidized bed process as well as in a fixed bed process.

The chlorosilanes supplied can be introduced into the reaction chamber in a liquid as well as in a gaseous form. However, the supply in the gaseous phase together with the hydrogen chloride is advantageous and preferred.

In a preferred embodiment of the process in accordance with the invention the resulting reaction mixture is condensed, a trichlorosilane-containing fraction is separated from the condensate and reintroduced into the reaction chamber.

BRIEF DESCRIPTION OF THE DRAWING

The graph shows the content of trichlorosilane in the produced chlorosilane mixture.

In a fluidized bed process, for example, the process suggested has the effects as outlined in the enclosed graphical representation. Without the supply of trichlorosilanes the percentage thereof decreases from 70 weight-% to 50 weight-% in the chlorosilane mixture consisting of trichlorosilane and silicon tetrachloride produced by the reaction at a temperature change from 470° C. to 570° C. However, if an additional 10 vol-% of trichlorosilane, referred to hydrogen chloride, is added to the hydrogen chloride in the reactor the percentage of trichlorosilane in the chlorosilane mixture produced changes from 50 weight-% to 0 weight-% in the same temperature interval. The process suggested hence permits selecting the percentage of trichlorosilane in the corresponding temperature interval from 0 to 70 weight-% as desired whereas without additional trichlorosilane the percentage thereof can only be varied between 50 to 70 weight-%.

The silicon tetrachloride produced corresponding to the process in accordance with the invention mainly serves as an initial product for the manufacture of microdispersed silicic acid. The trichlorosilane which is also a resulting product is used as a basis for the manufacture of organosilicon compounds, water repellent agents, as well as highly pure silicon for solar cells and semi conductors.

EXAMPLE 1

A fluidized bed reactor having a diameter of 200 mm was filled with metallic silicon dust up to a height of 400 mm; the percentage of silicon amounted to 98 weight-%. At an absolute pressure of 1.5 bar and a reactor temperature of 550° C. a mixture consisting of 90 vol.-% of hydrogen chloride and 10 vol.-% of trichlorosilane was introduced into the fluidized bed upwardly from the bottom which includes a distributor such that a speed of 15 cm/sec is maintained in the empty tube. In the chlorosilane obtained by reaction the percentage of trichlorosilane was at 10 weight-%.

EXAMPLE 1 A (COMPARATIVE EXAMPLE)

In a comparative example carried out under the same conditions as in example 1, however, no trichlorosilane was added, the result was a percentage of trichlorosilane of 54 weight-% in the reaction mixture.

EXAMPLE 2

7 mole/h of hydrogen chloride and 1.5 mole/h of gaseous trichlorosilane were introduced into a vertical fixed bed reactor having a diameter of 40 mm and a height of 100 mm and filled with pieces of silicon (silicon content of 90 weight-%) having an edge length of 3 to 5 mm. The reaction was carried out at 970° C. and at atmospheric pressure. After the reaction the gas mixture contained 2.52 mole/h of silicon tetrachloride and 0.47 mole/h trichlorosilane.

EXAMPLE 2 A (COMPARATIVE EXAMPLE)

In a comparative experiment with no trichlorosilane added and carried out under otherwise same conditions as in example 2 an initial use of 7 mole/h of hydrogen chloride resulted in 1.51 mole/h of silicon tetrachloride and 0.32 mole/h of trichlorosilane.

EXAMPLE 3

At a reaction temperature of 900° C. 4 mole/h of hydrogen chloride, 1 mole/h of trichlorosilane and 0.02 mole/h of dichlorosilane were, in the gaseous form, introduced into the same reactor as in example 2 which was filled with pieces of highly pure silicon having an edge length of 3 to 5 mm. After the reaction there was no dichlorosilane found; the reaction gases contained 1.45 mole/h of silicon tetrachloride and 0.4 mole/h of trichlorosilane.

EXAMPLE 3 A (COMPARATIVE EXAMPLE)

Using 4 mole/h of hydrogen chloride a comparative experiment with no trichlorosilane added and all other conditions the same as in example 3 resulted in a reaction product of 0.79 mole/h silicon tetrachloride and 0.28 mole/h of trichlorosilane.

EXAMPLE 4

At a reaction temperature of 1300° C. 7 mole/h of hydrogen chloride, 1.5 mole/h of gaseous trichlorosilane and 0.1 mole/h of gaseous dichlorosilane were introduced into the same fixed bed reactor with the same filling as in example 2. After the reaction the reaction gases did not contain any dichlorosilane. 2.77 mole/h of silicon tetrachloride and 0.20 mole/h of trichlorosilane were obtained.

EXAMPLE 4 A (COMPARATIVE EXAMPLE)

Using 7 mole/h of hydrogen chloride a comparative experiment with no trichlorosilane and dichlorosilane added and all other conditions the same as in example 4 resulted in 0.79 mole/h silicon tetrachloride and 0.28 mole/h of trichlorosilane.

EXAMPLE 5

A fluidized bed reactor having a diameter of 30 mm was filled with silicon-containing dust with a silicon content of 30 weight-% up to a height of 120 mm. At a reaction temperature of 400° C. and atmospheric pressure a mixture of hydrogen chloride and trichlorosilane (5 vol-% trichlorosilane, referred to hydrogen chloride) is upwardly introduced from the bottom via a frit, such that the speed is 10 cm/s in the empty tube. The chlorosilane mixture resulting from the reaction contained a trichlorosilane percentage of 24 weight-%.

EXAMPLE 5 A (COMPARATIVE EXAMPLE)

In a comparative experiment with no trichlorosilane added and all other conditions the same as in example 5 the percentage of trichlorosilane in the reaction mixture was at 45 weight-%.

We claim:

1. The method of increasing the percentage content of silicon tetrachloride in the gaseous reaction product mixture obtained by reacting hydrogen chloride or a mixture of hydrogen chloride and chlorine with a substance containing metallic silicon at a reaction temperature ranging from 300° C. to 1400° C., which consists essentially of introducing a chlorosilane of the formula $$SiH_{4-n}Cl_n$$

wherein n is an integer from 1 to 3, inclusive, together with the hydrogen chloride or the mixture of hydrogen chloride and chlorine reactants.

2. The method of claim 1, which additionally comprises condensing said gaseous reaction product mixture, separating a trichlorosilane-containing fraction from the condensate, and reintroducing said trichlorosilane-containing fraction into the reaction.

* * * * *